US012769634B2

(12) United States Patent
Sahu et al.

(10) Patent No.: US 12,769,634 B2
(45) Date of Patent: Oct. 20, 2026

(54) SYSTEM AND METHOD FOR TRACING AND MONITORING FUNCTIONS IN BINARY CODES

(71) Applicant: Harness Inc., San Francisco, CA (US)

(72) Inventors: Santosh Sahu, Karnataka (IN); Puneet Agarwal, Bangalore (IN); Sanjay Nagraj, Dublin, CA (US)

(73) Assignee: Harness Inc., San Francisco, CA (US)

( * ) Notice: Subject to any disclaimer, the term of this patent is extended or adjusted under 35 U.S.C. 154(b) by 432 days.

(21) Appl. No.: 18/586,600

(22) Filed: Feb. 26, 2024

(65) Prior Publication Data

US 2025/0272211 A1 Aug. 28, 2025

(51) Int. Cl.
*G06F 11/30* (2006.01)

(52) U.S. Cl.
CPC ........ *G06F 11/3089* (2013.01); *G06F 11/302* (2013.01)

(58) Field of Classification Search
CPC ........................... G06F 11/3089; G06F 11/302
See application file for complete search history.

(56) References Cited

U.S. PATENT DOCUMENTS

| | | | | |
|---|---|---|---|---|
| 8,533,836 B2 | 9/2013 | Saunders et al. | | |
| 10,514,909 B2 | 12/2019 | Yahav et al. | | |
| 11,720,468 B1 * | 8/2023 | Dullien | ............... | G06F 11/3414 717/139 |
| 2022/0358214 A1 | 11/2022 | Anderson et al. | | |
| 2024/0311172 A1 * | 9/2024 | Liu | ..................... | G06F 9/45558 |

OTHER PUBLICATIONS

Authors: Laune C. Harris, Barton P. Miller Practical Analysis of Stripped Binary Code (https://dl.acm.org/doi/10.1145/1127577.1127590) Published:Dec. 1, 2005.

* cited by examiner

*Primary Examiner* — Wissam Rashid
(74) *Attorney, Agent, or Firm* — Jason A. Smith; Shumaker, Loop & Kendrick, LLP

(57) ABSTRACT

A method for tracing and monitoring functions in binary codes is disclosed. The method includes receiving a probe corresponding to a target function, a target binary code, and a base source code. The method includes attaching the received probe in the target binary code based on presence of a debug symbol table associated with the target binary code and/or a matching function in dynamic linked library. Further, the method includes retrieving versions of assembly codes from the base source code and de-assembling the target binary code to generate a corresponding target assembly code. Furthermore, the method includes comparing the generated target assembly codes with the retrieved versions of the assembly code and determining a corresponding function in the target binary code for the target function if a heuristic match during comparison is more than pre-defined value.

20 Claims, 10 Drawing Sheets

700

| BINARY CODE | DEBUG SYMBOL |
|---|---|
| 001010110101 | START_PROGRAM |
| 110101000111 | LOAD_DATA |
| 010110100101 | ADD_VALUES |
| 101100110001 | STORE_RESULT |
| 100110101100 | LOOP_START |
| 010101011111 | CONDITION_TRUE |
| 111010010010 | UPDATE_COUNTER |
| 110100010101 | JUMP_TO_LOOP |
| 000000000000 | END_PROGRAM |

FIG. 7

800

DYNAMIC LINKED LIBRARY

```
// math_functions.c
#INCLUDE <STDIO.H>
INT ADD(INT A, INT B) {
    RETURN A + B;
}
INT SUBTRACT(INT A, INT B) {
    RETURN A - B;
```

FIG. 8

SYSTEM AND METHOD FOR TRACING AND MONITORING FUNCTIONS IN BINARY CODES

BACKGROUND

Technical Field

The present disclosure relates to the field of low-level code instrumentation and analysis, and particularly relates to a system and method for tracing and monitoring functions in binary codes.

Description of the Related Art

Modern computing systems, particularly those based on the Linux operating system, rely on intricate software structures to function efficiently. Critical components of the system, such as kernel functions and user space functions, are integral to the seamless operation of applications. Thus, monitoring and analyzing the behavior of such functions is vital for various purposes such as debugging, profiling, and security analysis. Typically, for the monitoring and analyzing an Extended Berkeley Packet Filter (eBPF) is attached to such functions based on the debugging symbols that facilitate the mapping of function names to specific memory addresses within the binary code. However, a challenge arises when dealing with stripped binaries that do not have debugging symbols due to various reasons, such as saving space. In other scenarios, dynamically linked libraries are employed for attaching such eBPF programs to functions through the debugging symbols present in the dynamic linked libraries. However, a challenge arises when such dynamic linked libraries are compiled into the binary and symbols are stripped and attaching eBPF programs to specific functions becomes difficult.

Therefore, there is a need for a system and method that can successfully attach tracing mechanisms, such as the eBPF programs, to specific functions in the binary codes irrespective of whether they are stripped binary or non-stripped binary, allowing for comprehensive monitoring and analysis of both kernel and user space functions, and overcoming the above-mentioned drawbacks.

BRIEF SUMMARY

One or more embodiments are directed to a system and method for tracing and monitoring functions in binary codes.

An embodiment of the present disclosure discloses a system for tracing and monitoring functions in binary codes. The system includes a receiver module to receive a probe corresponding to a target function, a target binary code, and a base source code. The probe corresponds to an Extended Berkeley Packet Filter (eBPF) for tracing and monitoring the target function. Further, the probe includes uprobe for tracking and monitoring user functions and/or kprobe for tracking and monitoring kernel functions.

In an embodiment, the system includes a first probe attachment module to attach the received probe in the target binary code based on presence of a debug symbol table associated with the target binary code. For attaching the probe, the first probe attachment module determines the presence of the debug symbol table associated with the target binary code and a function corresponding to the target function based on the debug symbol table. Upon determining the function corresponding to the target function, the first probe attachment module attaches the received probe to the determined function.

In an embodiment, the system includes a second probe attachment module to attach the received probe in the target binary code based on presence of a matching function in a dynamic linked library. For attaching the probe, the second probe attachment module determines the presence of the dynamic linked library associated with the target binary code and a function corresponding to the target function based in the dynamic linked library. Upon determining the function corresponding to the target function, the second probe attachment module attaches the received probe to the determined function.

In an embodiment, the system includes a third probe attachment module to attach the received probe in the target binary code in absence of the debug symbol table and the dynamic linked libraries. In such a scenario, the third probe attachment module retrieves one or more versions of assembly codes generated from the base source code. The one or more versions of assembly code are generated by compiling the received base source code based on one or more architectures and/or one or more compile options to generate one or more binary codes along with corresponding debug symbol tables. The one or more architectures correspond to different versions of operating systems and variants of hardware architectures and the one or more compile options correspond to optimization, debugging, target architecture, and/or feature selection. Upon generating the one or more binary codes, the third probe attachment module disassembles the generated one or more binary codes to generate one or more versions of the assembly code.

Upon retrieving the one or more versions of assembly codes, the third probe attachment module de-assembles the target binary code to generate a corresponding target assembly code. Next, the third probe attachment module compares the generated target assembly code with the retrieved one or more versions of the assembly codes. In an embodiment, the third probe attachment module receives architecture associated with the target device and compares the generated target assembly code with the retrieved one or more versions of the assembly code associated with the received architecture associated with the target device.

Furthermore, the third probe attachment module determines a corresponding function in the target binary code for the target function if a heuristic match during the comparison is more than a pre-defined threshold value. The pre-defined threshold value is selected from a range of values between 70-90 percent. In an embodiment, if more than one version of the assembly code exceeds the pre-defined threshold value, then the third probe attachment module selects the version of the assembly code with highest heuristic match for attaching the probe.

An embodiment of the present disclosure discloses a method for tracing and monitoring functions in binary codes. The method includes the steps of receiving a probe corresponding to a target function, a target binary code, and a base source code. In an embodiment, the method includes the steps of attaching the received probe to the target binary code based on presence of a debug symbol table associated with the target binary code. In such a scenario, the method includes the steps of determining the presence of the debug symbol table associated with the target binary code, determining a function corresponding to the target function based on the debug symbol table, and attaching the received probe to the determined function In an embodiment, the method includes the steps of attaching the received probe in the target binary code based on presence of a matching function in a dynamic linked library. In such a scenario, the method includes the steps of determining the presence of the dynamic linked library associated with the target binary code, determining a function corresponding to the target function based in the dynamic linked library, and attaching the received probe to the determined function.

In an embodiment, the method also includes the steps of attaching the received probe in the target binary code in absence of the debug symbol table and the dynamic linked libraries. To attach the probe, the method includes the steps of retrieving one or more versions of assembly codes generated from the base source code. Such retrieving of the one or more versions, the method includes the steps of compiling the received base source code based on one or more architectures and/or one or more compile options to generate one or more binary codes along with corresponding debug symbol tables. Upon compiling, the method includes the steps of disassembling the generated one or more binary codes to generate one or more versions of the assembly code.

Further, the method includes the steps of de-assembling the target binary code to generate a corresponding target assembly code. Furthermore, the method includes the steps of comparing the generated target assembly codes with the retrieved one or more versions of the assembly code. In an embodiment, the method includes the steps of receiving architecture associated with target device and comparing the generated target assembly code with the retrieved one or more versions of the assembly code associated with the received architecture associated with the target device.

Thereafter, the method includes the steps of determining a corresponding function in the target binary code for the target function if a heuristic match during the comparison is more than a pre-defined threshold value. In an embodiment, if more than one version of the assembly code exceeds the pre-defined threshold value, then the version of the assembly code with highest heuristic match is selected for attaching the probe.

The features and advantages of the subject matter here will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 7 shows an example of a binary code with a debugging symbol table, in accordance with an embodiment of the present disclosure.

FIG. 8 shows an example a dynamic linked library, in accordance with an embodiment of the present disclosure.

Figure 1:
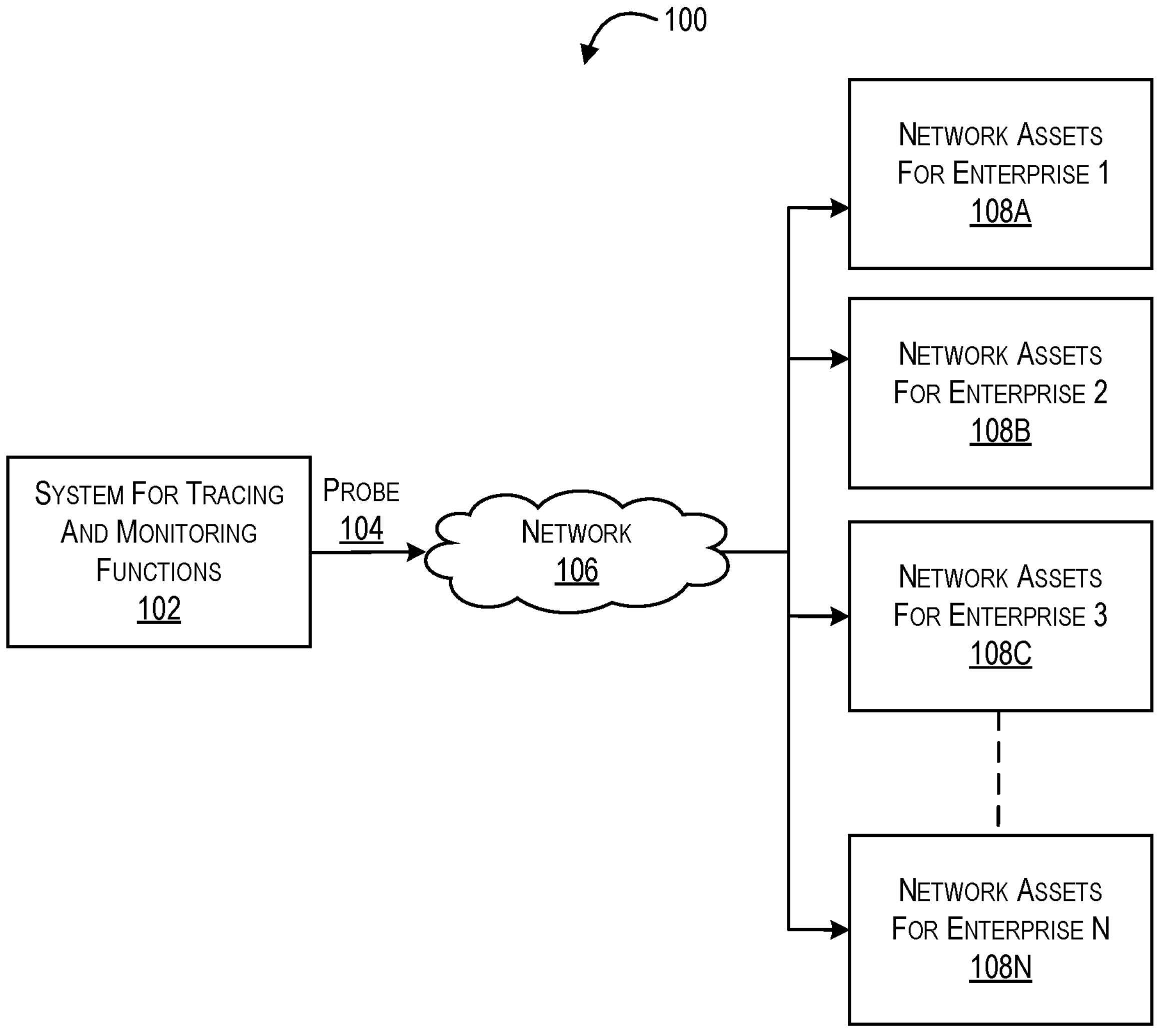
FIG. 1 illustrates an exemplary environment having network assets for various enterprises connected to a system for tracing and monitoring functions, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system and method for tracing and monitoring functions in binary codes. The system may receive a probe corresponding to a target function, a target binary code, and a base source code. The probe may correspond to an Extended Berkeley Packet Filter (eBPF) for tracing and monitoring the target function. Further, the probe may include uprobe for tracking and monitoring user functions and/or kprobe for tracking and monitoring kernel functions.

In an embodiment, the system may attach the received probe to the target binary code based on presence of a debug symbol table associated with the target binary code. In such a scenario, the system may determine the presence of the debug symbol table associated with the target binary code and a function corresponding to the target function based on the debug symbol table. Upon determining the function corresponding to the target function, the system may attach the received probe to the determined function. In an embodiment, the system may attach the received probe in the target binary code based on presence of a matching function in a dynamic linked library. In such a scenario, the system may determine the presence of the dynamic linked library associated with the target binary code and a function corresponding to the target function based in the dynamic linked library. Upon determining the function corresponding to the target function, the system may attach the received probe to the determined function.

In an embodiment, the system may attach the received probe in the target binary code in absence of the debug symbol table and the dynamic linked libraries. In such a scenario, the system may retrieve one or more versions of assembly codes generated from the base source code. In order to generate such one or more versions of the assembly codes, the system may compile the received base source code based on one or more architectures and/or one or more compile options to generate one or more binary codes along with corresponding debug symbol tables. After generating the one or more binary codes, the system may disassemble the generated one or more binary codes to generate one or more versions of assembly codes. The one or more architectures may correspond to different versions of operating systems and variants of hardware architectures. Further, the one or more compile options may correspond to optimization, debugging, target architecture, and/or feature selection. The system may further de-assemble the target binary code to generate a corresponding target assembly code.

Further, the system may compare the generated target assembly codes with the retrieved one or more versions of the assembly code. Additionally, or alternatively, the system may receive architecture associated with target device and compare the generated target assembly code with the retrieved one or more versions of the assembly code associated with the received architecture associated with the target device. Thereafter, the system may determine a corresponding function in the target binary code for the target function if a heuristic match during the comparison is more than a pre-defined threshold value. The pre-defined threshold value may be selected from a range of values between 70-90 percent. Further, if more than one version of the assembly code exceeds the pre-defined threshold value, then the third probe attachment module may select the version of the assembly code with highest heuristic match.

FIG. 1 illustrates an exemplary environment 100 having network assets for various enterprises 108A, 108B, 108C, . . . , 108N (hereinafter known as "network assets of enterprise" 108) connected to a system 102 for tracing and monitoring functions, in accordance with an embodiment of the present disclosure. In an embodiment, the system 102 may be connected to the network assets of enterprise 108 via a network 106. The network 106 (such as a communication network) may include, without limitation, a direct interconnection, a Local Area Network (LAN), a Wide Area Network (WAN), a wireless network (e.g., using Wireless Application Protocol), the Internet, and the like. Further, the network assets may vary from hardware assets, such as routers, switches, hubs, firewalls, printers, hosts, servers, and wireless access points, to software assets such as OS, applications, patches, and updates. For tracing and monitoring the functions associated with such assets, a user may create a probe 104 that may be attached to a function. The probe 104 may correspond to an Extended Berkeley Packet Filter (eBPF) that may serve as a powerful tool for tracing and monitoring either or both of kernel and user space functions. The user may create custom eBPF programs that may be executed when specific user or kernel functions are invoked.

In an embodiment, the user functions are associated with a user space i.e. a part of memory where regular applications and software run. For example, web browsers, word processors, games, and other software applications that operate in the user space. Such functions perform tasks that the users directly interact with, like browsing the internet, typing documents, and playing games. The eBPF programs attached to functions within the user space to trace and monitor their activities are called uprobes. Such tracing and monitoring allows debugging, profiling, and performance analysis of the user functions. In an embodiment, the kernel functions are associated with a kernel space i.e., a protected part of memory where the core functions of the operating system, including the device drivers and low-level system processes, reside. Typically, when the user functions need to perform a task that requires access to hardware or sensitive system resources, it requests the kernel to perform that task on its behalf. For example, when a user space function wants to read data from a hard disk, then it requests the kernel to handle the disk I/O operations. The eBPF programs attached to functions within the kernel space to trace and monitor their activities are called kprobes. Such tracing and monitoring allows trace and analyze low-level system behavior. In a non-limiting example, when dealing with binaries that utilize Transport Layer Security (TLS) libraries such as OpenSSL, the uprobe may be attached to critical functions like SSL_read and/or SSL_write that handle plaintext data which makes them crucial for security monitoring.

Figure 2:
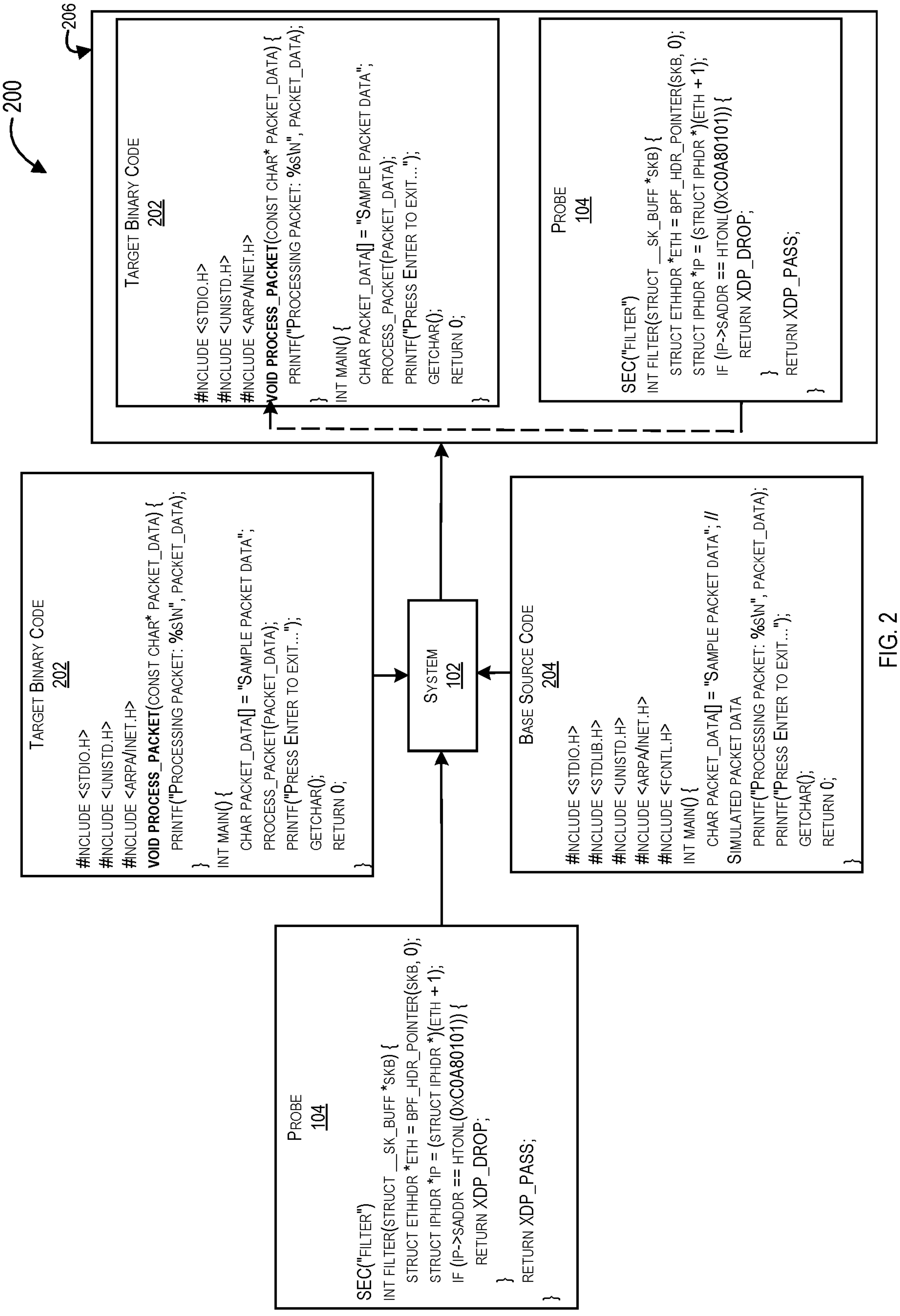
FIG. 2 illustrates the exemplary environment of the system for tracing and monitoring functions in binary codes in the network asset of the enterprise, in accordance with an embodiment of the present disclosure.

FIG. 2 illustrates an exemplary environment 200 of the system 102 for tracing and monitoring functions in binary codes in the network asset of the enterprise 108, in accordance with an embodiment of the present disclosure. In an embodiment, the system 102 may receive the probe 104 to be attached to a target function, a target binary code 202, and a base source code 204. For the purpose of the present disclosure, the target binary code 202 may correspond to a compiled machine code that is implemented on the network asset of the enterprise 108 that may be specific to the corresponding system architecture and/or the compile options, such that it is directly executed by the corresponding processor. In an embodiment, the architecture may correspond to different versions of operating systems and variants of hardware architectures and the compile options correspond to optimization, debugging, target architecture, feature selection, or a combination thereof.

In an embodiment, the target binary code 202 may have a debug symbol table corresponding to symbol information/debugging information as an attached additional piece of data added to it during the compilation process. Such debug symbol table may provide mapping between the base source code 204 and the target binary code 202 to locate the target function in the target binary code 202 that may make it easier for the user and debugging tools to understand the behavior of the program and diagnose the corresponding issues. In such a scenario, the system 102 may attach the probe 104 to the target function in the target binary code 202 based on the corresponding debug symbol table.

In another embodiment, the target binary code 202 may have a Dynamically Linked Library (DLL). Such DLL may be a collection of precompiled routines, functions, and procedures that software application may utilize and such DLL may contain code that may be shared and used by multiple programs simultaneously. Typically, when a program is developed, it often relies on certain functions or resources that may be common to many other programs, thus instead of including all of such common code within each individual programs that may lead to redundancy and waste of resources, the user create dynamic libraries. For example, the DLL may contain functions like SSL_read and SSL_write. In such a scenario, the system 102 may attach the probe 104 to a matching function, to the target function, in the target binary code 202 based on the DLL.

In yet another embodiment, the target binary code 202 may be a stripped binary code i.e., it may be stripped of the debug symbol table and/or the DLL to, for example, save space. Therefore, a location of the target function in the target binary code 202 may not be identified and thus, attaching the probe 104 may be a difficult task. In such a scenario, the system 102 may retrieve one or more versions of the assembly code generated from the based code and de-assembly the target binary code 202 to generate a corresponding target assembly code. Then, the system 102 may compare the generated target assembly code with the retrieved one or more versions of the assembly code to determine a corresponding function in the target binary code 202 for the target function if a heuristic matching during the comparison is more than a pre-defined threshold value. Further, the system 102 may attach the probe 104 with the target binary code 202 based on the location of the determined corresponding function, as shown by the box 206.

Figure 3:
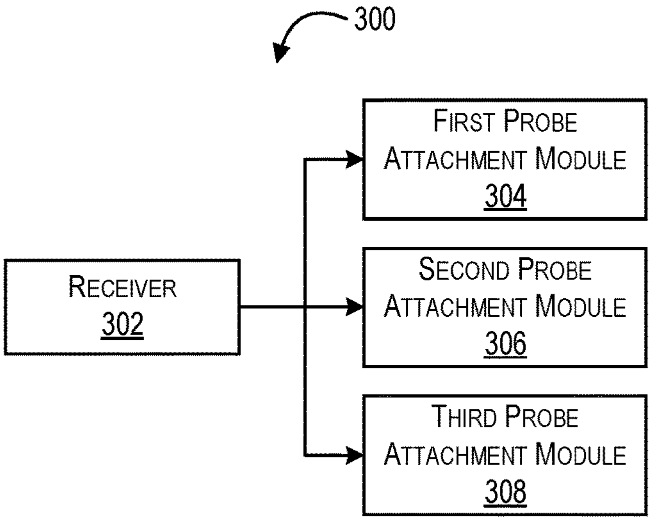
FIG. 3 illustrates a block diagram of the system for tracing and monitoring functions in binary codes, in accordance with an embodiment of the present disclosure.

FIG. 3 illustrates a block diagram 300 of the system 102 for tracing and monitoring functions in binary codes, in accordance with an embodiment of the present disclosure.

In an embodiment, the system 102 may include a receiver 302, a first probe attachment module 304, a second probe attachment module 306, and a third probe attachment module 308. The receiver 302, the first probe attachment module 304, the second probe attachment module 306, and the third probe attachment module 308 may be communicatively coupled to a memory and a processor of the system 102. The processor may be configured to control the operations of the receiver 302, the first probe attachment module 304, the second probe attachment module 306, and the third probe attachment module 308. In an embodiment of the present disclosure, the processor and the memory may form a part of a chipset installed in the system 102. In another embodiment of the present disclosure, the memory may be implemented as a static memory or a dynamic memory. In an example, the memory may be internal to the system 102, such as an onside-based storage. In another example, the memory may be external to the system 102, such as cloud-based storage. Further, the processor may be implemented as one or more microprocessors microcomputers, microcomputers, digital signal processors, central processing units, state machines, logic circuitries, and/or any devices that manipulate signals based on operational instructions.

In an embodiment, the receiver 302 may receive the probe 104 corresponding to a target function, a target binary code 202, and a base source code 204. For the sake of understanding, the present disclosure utilizes a non-limiting example of the probe 104 and the target binary code 202, as shown in FIG. 2. As illustrated, the probe 104 may correspond to an eBPF program for monitoring incoming network packets on a specific network interface and filter out packets coming from a particular IP address (e.g., 192.168.1.1). Such probe 104 needs to be attached to function pertaining to a network interface that a user wants to filter the packets. Similarly, the target binary code 202 may correspond to a program that receives network packets and processes them. Further, the target binary code 202 may include a function 'process_packet' that may process incoming network packets. Thus, the probe 104 need to be attached to this function for monitoring and modifying the behavior of the 'process_packet' function.

In an embodiment, the first probe attachment module 304 may attach the received probe 104 in the target binary code 202 based on presence of the debug symbol table associated with the target binary code 202. The debug symbol table may be explained in detail in the following paragraphs. In order to attach probe 104 based on the debug symbol table, the first probe attachment module 304 may first determine the presence of the debug symbol table associated with the target binary code 202. Upon determining the presence of the debug symbol table, the first probe attachment module 304 may determine a function corresponding to the target function based on the determined debug symbol table. Accordingly, the first probe attachment module 304 may attach the received probe 104 to the determined function for tracing and monitoring the target function in the target binary code 202.

In an embodiment, the second probe attachment module 306 may attach the received probe 104 in the target binary code 202 based on presence of a matching function in the dynamic linked library of the target binary code 202. The dynamic linked library may be explained in detail in the following paragraphs. In order to attach probe 104 based on the matching function in the dynamic linked library, the second probe attachment module 306 may first determine the presence of the dynamic linked library associated with the target binary code 202. Upon determining the presence of the dynamic linked library, the second probe attachment module 306 may determine a function corresponding to the target function based in the dynamic linked library. Accordingly, the second probe attachment module 306 may attach the received probe 104 to the determined function for tracing and monitoring the target function in the target binary code 202.

In an embodiment, the third probe attachment module 308 attach the received probe 104 in the target binary code 202 in absence of the debug symbol table and the dynamic linked libraries i.e., the target binary code 202 is a stripped binary code. In such a scenario, the third probe attachment module 308 may individually process the base source code 204 to create one or more assembly code variants and compare the created variants with an assembly code of the target binary code 202 for determining the location of the target function. Based on the determined location, the third probe attachment module 308 may attach the received probe 104 to the target function in the target binary code 202. The third probe attachment module 308 has been explained in detail in conjunction with FIGS. 4 and 5.

Figure 4:
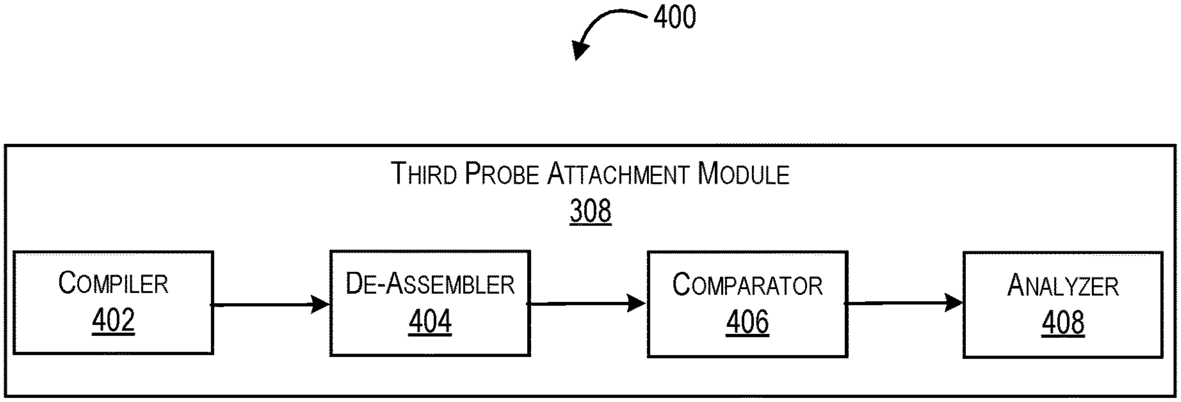
FIG. 4 illustrates a detailed block diagram of the third probe attachment module, in accordance with an embodiment of the present disclosure.
Figure 5A:
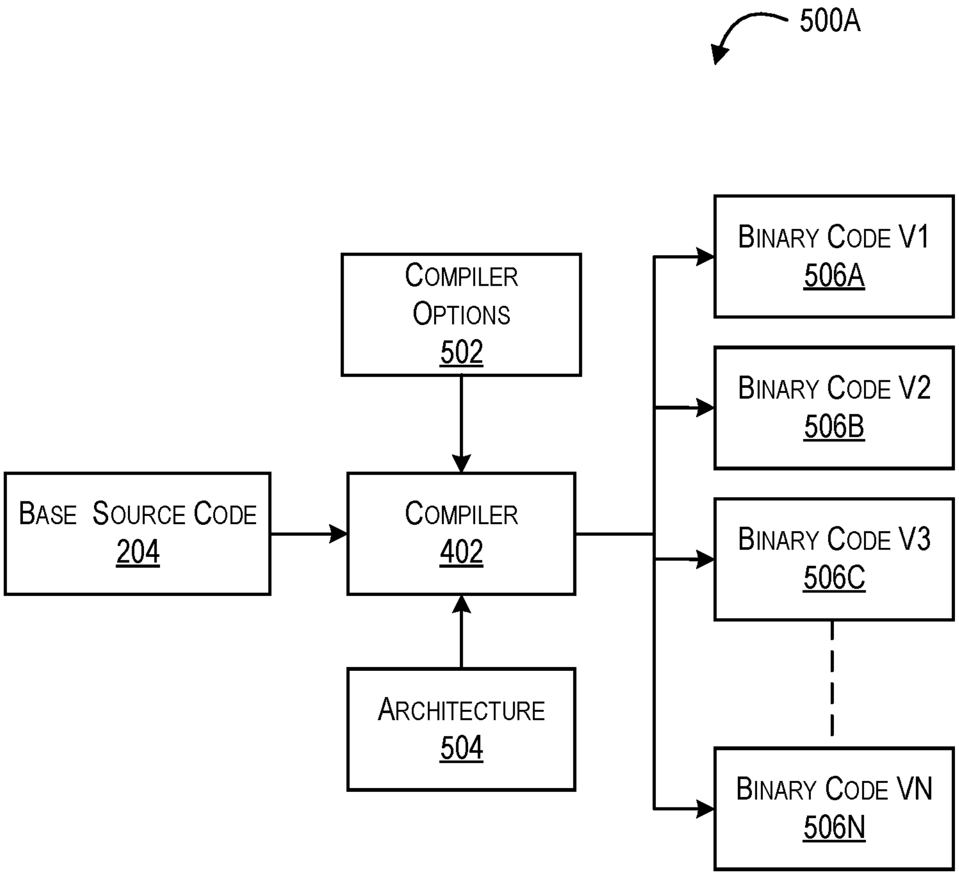
FIG. 5A illustrates an exemplary operation of a compiler, in accordance with an embodiment of the present disclosure.
Figure 5B:
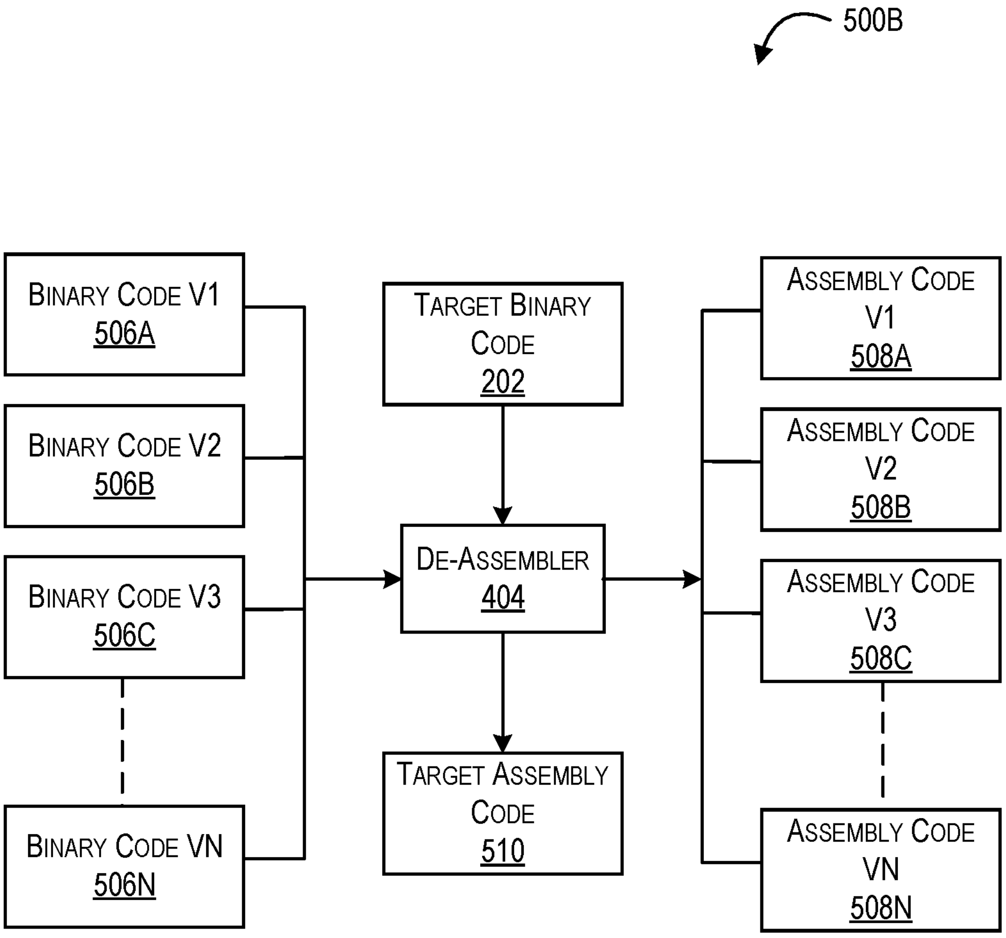
FIG. 5B illustrates an exemplary operation of a de-assembler, in accordance with an embodiment of the present disclosure.
Figure 5C:
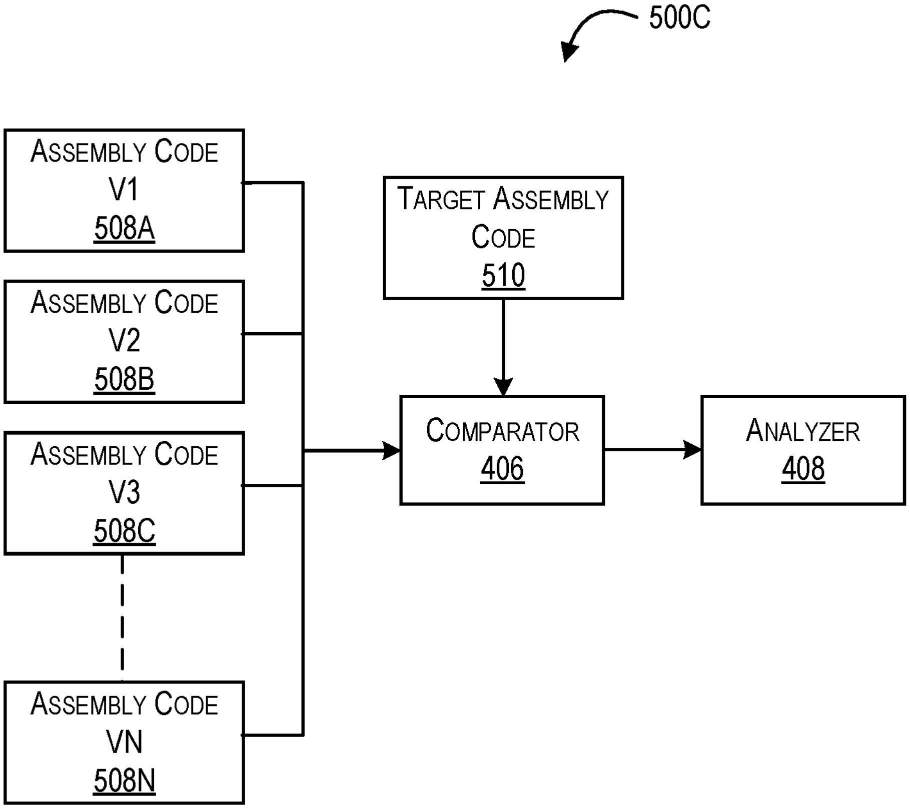
FIG. 5C illustrates an exemplary operation of a comparator and an analyzer, in accordance with an embodiment of the present disclosure.

FIG. 4 illustrates a detailed block diagram 400 of the third probe attachment module 308, in accordance with an embodiment of the present disclosure. FIG. 5A illustrates an exemplary operation 500A of a compiler 402, in accordance with an embodiment of the present disclosure. FIG. 5B illustrates an exemplary operation 500B of a de-assembler 404, in accordance with an embodiment of the present disclosure. FIG. 5C illustrates an exemplary operation 500C of a comparator 406 and an analyzer 408, in accordance with an embodiment of the present disclosure. For the sake of brevity, FIGS. 4, 5A, 5B, 5C, and 5D have been explained together.

In an embodiment, as shown in FIG. 4, the third probe attachment module 308 may include a compiler 402, a de-assembler 404, a comparator 406, and an analyzer 408. The compiler 402, the de-assembler 404, the comparator 406, and the analyzer 408 may be communicatively coupled to a memory and a processor of the third probe attachment module 308. The processor may be configured to control the operations of the compiler 402, the de-assembler 404, the comparator 406, and the analyzer 408. In an embodiment of the present disclosure, the processor and the memory may form a part of a chipset installed in the third probe attachment module 308. In another embodiment of the present disclosure, the memory may be implemented as a static memory or a dynamic memory. In an example, the memory may be internal to the third probe attachment module 308, such as an onside-based storage. In another example, the memory may be external to the third probe attachment module 308, such as cloud-based storage. Further, the processor may be implemented as one or more microprocessors microcomputers, microcomputers, digital signal processors, central processing units, state machines, logic circuitries, and/or any devices that manipulate signals based on operational instructions.

In an embodiment, as shown in FIG. 5A, the compiler 402 may compile the received base source code 204 based on one or more architectures 504 and one or more compile options 502 to generate one or more binary codes 506A, 506B, 506C, . . . 506N. Such one or more binary codes 506A, 506B, 506C, . . . 506N are generated along with corresponding debug symbol tables such that location of all the functions in each of the one or more binary codes 506A, 506B, 506C, . . . 506N is well defined. For example, each of the binary code may be a compilation combination of the base source code 204 in terms of architecture types and compile options, such that if there are 4 architectures and 3 compile options, then there may be 12 binary codes based on different permutation and combinations thereof.

In an embodiment, as shown in FIG. 5B, the de-assembler 404 may disassemble the generated one or more binary codes 506A, 506B, 506C, . . . , 506N to generate one or more versions of assembly codes 508A, 508B, 508C, . . . , 508N. Such generated one or more binary codes 506A, 506B, 506C, . . . , 506N may be retrieved by the third probe attachment module 308 for utilization. Further, the de-assembler 404 may also de-assemble the target binary code 202 to generate a corresponding target assembly code 510.

In an embodiment, as shown in FIG. 5C, the comparator 406 may compare the generated target assembly code 510 with the retrieved one or more versions of the assembly codes 508A, 508B, 508C, . . . , 508N. The comparator 406 may produce a heuristic match between the target assembly code 510 and the retrieved one or more versions of the assembly codes 508A, 508B, 508C, . . . , 508N. Additionally, or alternatively, the comparator 406 may receive architecture associated with target device, such that it may compare the generated target assembly code with the retrieved one or more versions of the assembly codes associated with the received architecture associated with the target device.

In an embodiment, the analyzer 408 may determine a corresponding function in the target binary code 202 for the target function if the heuristic match during the comparison is more than a pre-defined threshold value. In an exemplary embodiment, the pre-defined threshold value may be selected from a range of values between 70-90 percent. Further, if more than one version of the assembly code exceeds the pre-defined threshold value, then the analyzer 408 of the third probe attachment module 308 may select the version of assembly code with highest heuristic match for attaching the probe 104.

Figure 6:
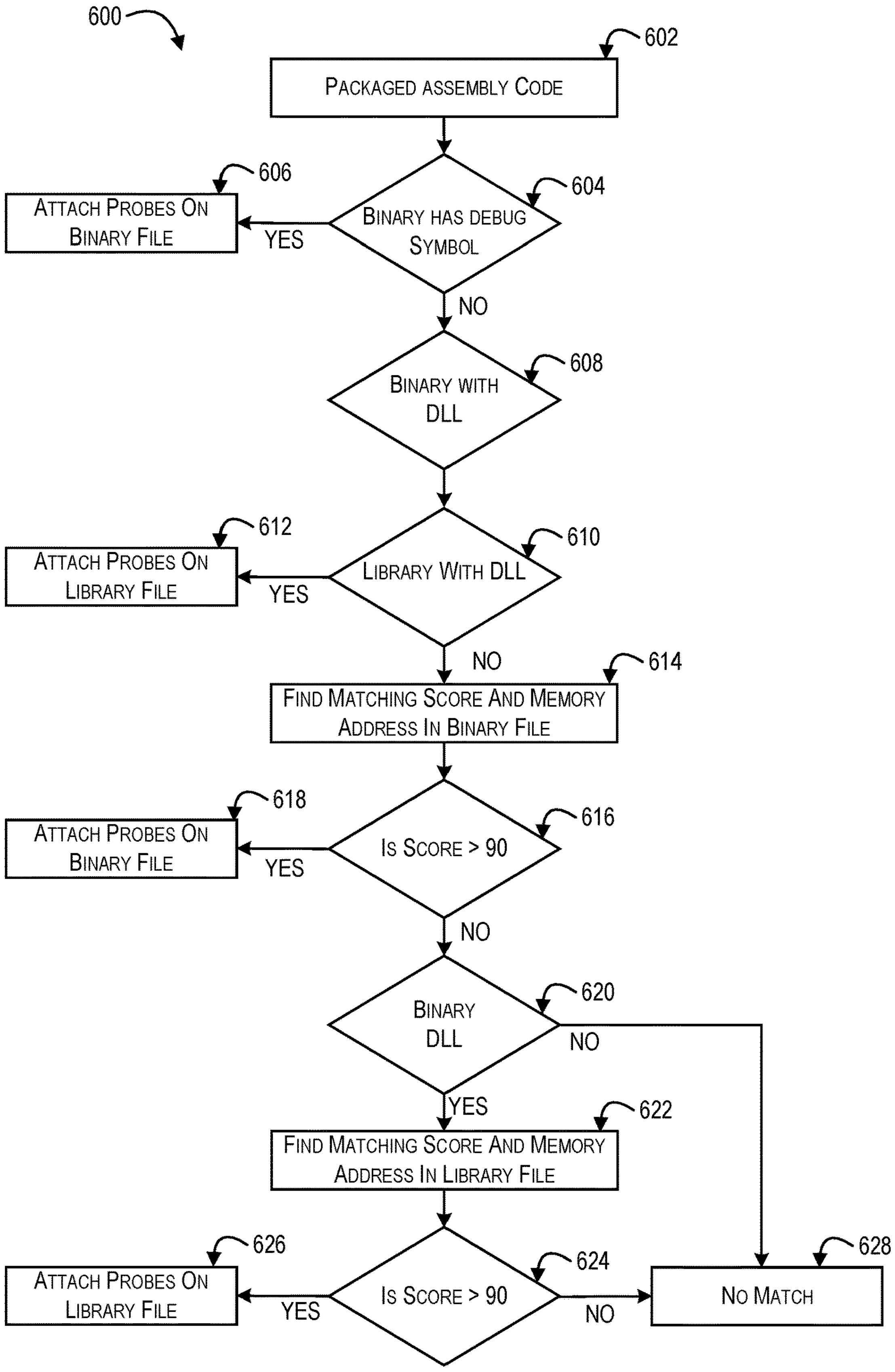
FIG. 6 illustrates an operation of the system for tracing and monitoring functions in binary codes, in accordance with an embodiment of the present disclosure.

FIG. 6 illustrates an operation 600 of the system 102 for tracing and monitoring functions in binary codes, in accordance with an embodiment of the present disclosure. Initially, a packaged assembly code may be received, as shown by box 602. Next, the received packaged assembly code may be checked for the presence of debug symbol, as shown by box 604. In one scenario, if the debug symbol is present, then the system 102 may attach the probe 104 to the binary file based on the debug symbol, as shown by box 606. In another scenario, if the debug symbol is not present, then the system 102 may check the presence of the DLL in the binary, as shown by box 608. Further, if there is a library with the DLL, as shown by box 610, then the system 102 may attach the probe 104 on the library file, as shown by box 612. On the other hand, if there is no library with the DLL, then the system 102 may find a matching score between the assembly code and the binary file along with a memory address in the binary file, as shown by box 614. The system 102 may then check if the matching score is more than 90, as shown by box 616. In one scenario, if the score is more than 90, then the system 102 may attach the probe 104 on the binary file based on the matched assembly code, as shown by box 618. In another scenario, if the score is less than 90, then the system 102 may conclude that there is no match and the binary shall not be attached, as shown by box 620.

FIG. 7 shows an example 700 of a binary code with the debugging symbol table, in accordance with an embodiment of the present disclosure. As illustrated, the binary code may be a sequence of 0s and 1s that may represent machine instructions or data in a computer program. Further, the debug symbols may not be part of the binary code itself but may be used for debugging and symbolic information to make it easier for the users to understand the purpose of each instruction during debugging.

FIG. 8 shows an example 800 of a Dynamic Linked Library (DLL), in accordance with an embodiment of the present disclosure. The DLL may be a collection of precompiled routines, functions, and procedures that software application may utilize and such DLL may contain code that may be shared and used by multiple programs simultaneously. Typically, when a program is developed, it often relies on certain functions or resources that may be common to many other programs, thus instead of including all of such common code within each individual programs that may lead to redundancy and waste of resources, the user may create dynamic libraries that may be accessed to perform redundant tasks. As illustrated, a DLL of a math_function having precompiled functions for addition and subtraction. In operation, a program may call the DLL and provide the addition and/or subtraction parameters to the DLL and may received the final answer without actually including the redundant program of addition and/or subtraction in the original program.

Figure 9:
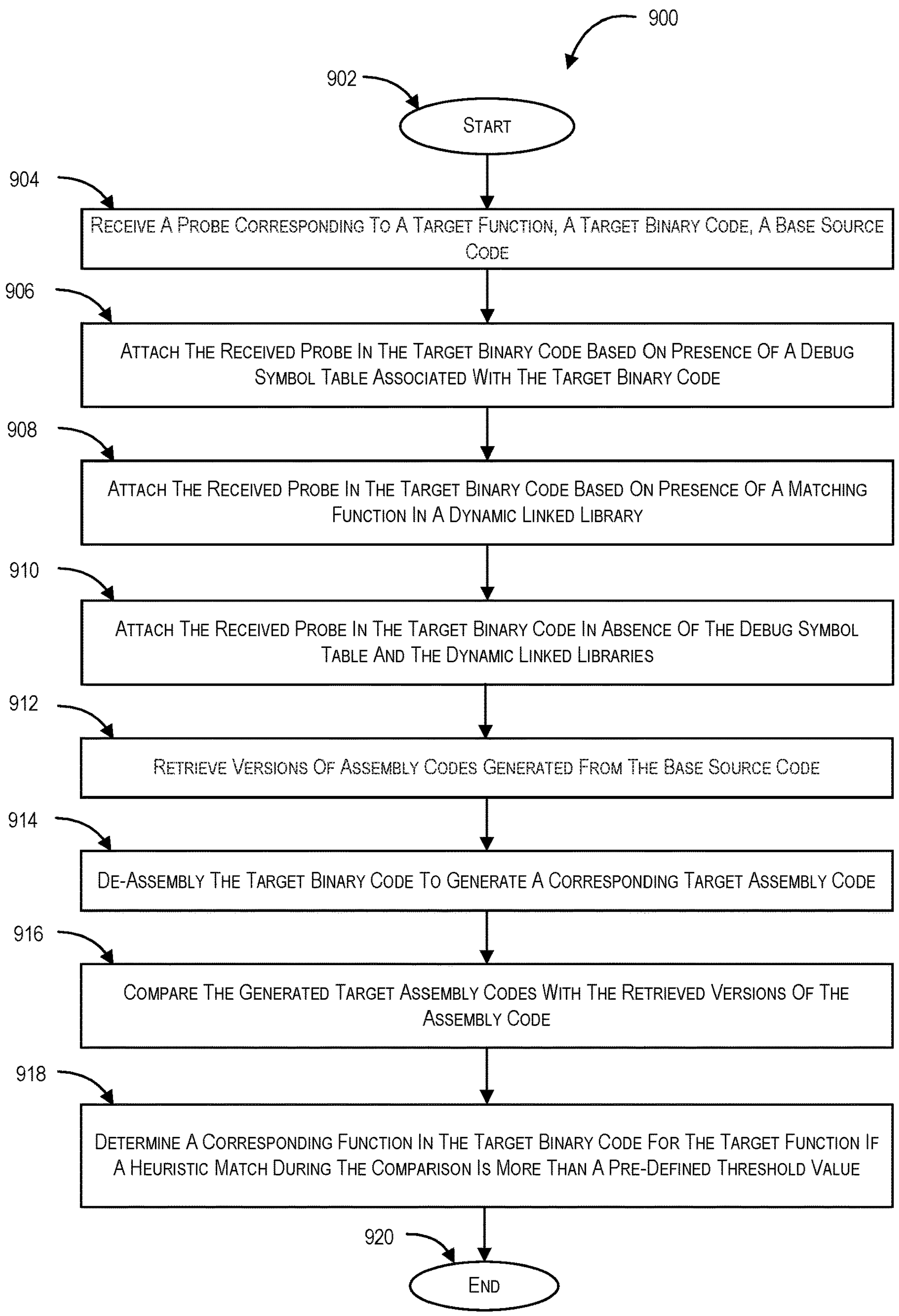
FIG. 9 is a flow chart of a method for tracing and monitoring functions in binary codes, in accordance with an embodiment of the present disclosure.

FIG. 9 is a flow chart 900 of a method for tracing and monitoring functions in binary codes, in accordance with an embodiment of the present disclosure. The method starts at step 902.

At first, a probe corresponding to a target function, a target binary code, and a base source code may be received, at step 904. In an embodiment, the probe may corresponds to an Extended Berkeley Packet Filter (eBPF) for tracing and monitoring the target function and may include uprobe for tracking and monitoring user function and/or kprobe for tracking and monitoring kernel functions.

Next, the received probe may be attached in the target binary code based on presence of a debug symbol table associated with the target binary code, at step 906. In order the attach the probe in this scenario, the method may include the steps of determining the presence of the debug symbol table associated with the target binary code and a function corresponding to the target function based on the debug symbol table for attaching the received probe to the determined function.

Next, the received probe may be attached in the target binary code based on presence of a matching function in a dynamic linked library, at step 908. For attaching the probe in this scenario, the method may include the steps of determining the presence of the dynamic linked library associated with the target binary code and a function corresponding to the target function based in the dynamic linked library for attaching the received probe to the determined function.

Next, the received probe may be attached in the target binary code in absence of the debug symbol table and the dynamic linked libraries, at step 910. In order to attached the probe in this scenario, one or more versions of assembly codes generated from the base source code may be received, at step 912. The one or more versions of assembly codes may be generated by compiling the received base source code based on one or more architectures and one or more compile options to generate one or more binary codes along with corresponding debug symbol tables and disassembling the generated one or more binary codes to generate one or more versions of assembly codes. The one or more architectures may correspond to different versions of operating systems and variants of hardware architectures and the one or more compile options may correspond to optimization, debugging, target architecture, and/or feature selection Next, the target binary code may be de-assembled to generate a corresponding target assembly code, at step 914. Next, the generated target assembly codes may be compared with the retrieved one or more versions of the assembly code, at step 916. In an embodiment, the method may include the steps of receiving architecture associated with target device and comparing the generated target assembly code with the retrieved one or more versions of the assembly code associated with the received architecture associated with the target device.

Thereafter, a corresponding function may be determined in the target binary code for the target function if a heuristic match during the comparison is more than a pre-defined threshold value, at step 918. In an embodiment, the pre-defined threshold value may be selected from a range of values between 70-90 percent. Further, if more than one version of the assembly code exceeds the pre-defined threshold value, then the version of assembly code with highest heuristic match may be selected to attaching the probe. The method ends at step 920.

Figure 10:
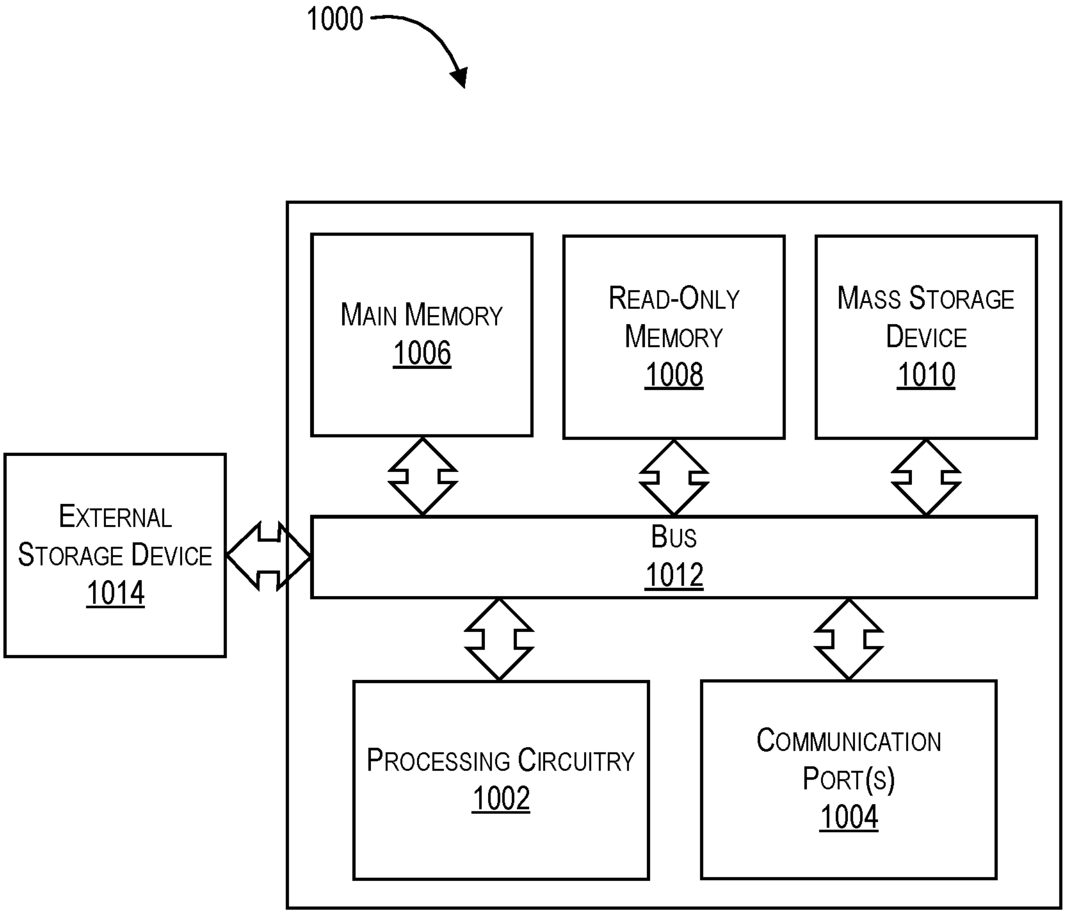
FIG. 10 illustrates an exemplary computer unit in which or with which embodiments of the present disclosure may be utilized.

FIG. 10 illustrates an exemplary computer system in which or with which embodiments of the present disclosure may be utilized. As shown in FIG. 10, a computer system 1000 includes an external storage device 1014, a bus 1012, a main memory 1006, a read-only memory 1008, a mass storage device 1010, a communication port 1004, and a processor 1002.

Those skilled in the art will appreciate that computer system 1000 may include more than one processor 1002 and communication ports 1004. Examples of processor 1002 include, but are not limited to, an Intel® Itanium® or Itanium 2 processor(s), or AMD® Opteron® or Athlon MP® processor(s), Motorola® lines of processors, FortiSOC™ system on chip processors or other future processors. The processor 1002 may include various modules associated with embodiments of the present disclosure.

The communication port 1004 can be any of an RS-232 port for use with a modem-based dialup connection, a 10/100 Ethernet port, a Gigabit or 10 Gigabit port using copper or fiber, a serial port, a parallel port, or other existing or future ports. The communication port 1004 may be chosen depending on a network, such as a Local Area Network (LAN), Wide Area Network (WAN), or any network to which the computer system connects.

The memory 1006 can be Random Access Memory (RAM), or any other dynamic storage device commonly known in the art. Read-Only Memory 808 can be any static storage device(s) e.g., but not limited to, a Programmable Read-Only Memory (PROM) chips for storing static information e.g., start-up or BIOS instructions for processor 1002.

The mass storage 1010 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 1012 communicatively couples processor(s) 1002 with the other memory, storage, and communication blocks. The bus 1012 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 1002 to a software system.

Optionally, operator and administrative interfaces, e.g., a display, keyboard, and a cursor control device, may also be coupled to bus 1004 to support direct operator interaction with the computer system. Other operator and administrative interfaces can be provided through network connections connected through communication port 1004. An external storage device 1010 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term “coupled to” is intended to include both direct coupling (in which two elements that are coupled to each other contact each other) and indirect coupling (in which at least one additional element is located between the two elements). Therefore, the terms “coupled to” and “coupled with” are used synonymously. Within the context of this document terms “coupled to” and “coupled with” are also used euphemistically to mean “communicatively coupled with” over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

What is claimed is:

1. A system for tracing and monitoring functions in binary codes, the system comprises:

a receiver module to receive a probe corresponding to a target function, a target binary code, and a base source code;

a first probe attachment module to attach the received probe in the target binary code based on presence of a debug symbol table associated with the target binary code;

a second probe attachment module to attach the received probe in the target binary code based on presence of a matching function in a dynamic linked library; and a third probe attachment module to attach the received probe in the target binary code in absence of the debug symbol table and the dynamic linked libraries, wherein attaching the probe comprises the steps of:

retrieving one or more versions of assembly codes generated from the base source code;

de-assembling the target binary code to generate a corresponding target assembly code;

comparing the generated target assembly code with the retrieved one or more versions of the assembly codes; and determining a corresponding function in the target binary code for the target function if a heuristic match during the comparison is more than a pre-defined threshold value.

2. The system of claim 1, wherein the first probe attachment module:

determines the presence of the debug symbol table associated with the target binary code;

determines a function corresponding to the target function based on the debug symbol table; and attaches the received probe to the determined function.

3. The system of claim 1, wherein the second probe attachment module:

determines the presence of the dynamic linked library associated with the target binary code;

determines a function corresponding to the target function based in the dynamic linked library; and attaches the received probe to the determined function.

4. The system of claim 1, wherein the one or more versions of assembly code are generated by:

compiling the received base source code based at least on: one or more architectures and one or more compile options to generate one or more binary codes along with corresponding debug symbol tables; and disassembling the generated one or more binary codes to generate one or more versions of assembly codes.

5. The system of claim 1, wherein the one or more architectures correspond to different versions of operating systems and variants of hardware architectures.

6. The system of claim 1, wherein the one or more compile options correspond to at least one of: optimization, debugging, target architecture, and feature selection.

7. The system of claim 1, wherein the third probe attachment module further:

receives architecture associated with target device;

compare the generated target assembly code with the retrieved one or more versions of the assembly code associated with the received architecture associated with the target device.

8. The system of claim 1, wherein the probe corresponds to an Extended Berkeley Packet Filter (eBPF) for tracing and monitoring the target function.

9. The system of claim 1, wherein the probe includes at least one of: uprobe for tracking and monitoring user function and kprobe for tracking and monitoring kernel functions.

10. The system of claim 1, wherein the pre-defined threshold value is selected from a range of values between 70-90 percent.

11. The system of claim 1, wherein if more than one version of the assembly code exceeds the pre-defined threshold value, then the third probe attachment module selects the version of assembly code with highest heuristic match for attaching the probe.

12. A method for tracing and monitoring functions in binary codes, the method comprises:

receiving a probe corresponding to a target function, a target binary code, and a base source code;

attaching the received probe in the target binary code based on presence of a debug symbol table associated with the target binary code;

attaching the received probe in the target binary code based on presence of a matching function in a dynamic linked library;

attaching the received probe in the target binary code in absence of the debug symbol table and the dynamic linked libraries, wherein attaching the probe comprises the steps of:

retrieving one or more versions of assembly codes generated from the base source code;

de-assembling the target binary code to generate a corresponding target assembly code;

comparing the generated target assembly codes with the retrieved one or more versions of the assembly code; and determining a corresponding function in the target binary code for the target function if a heuristic match during the comparison is more than a pre-defined threshold value.

13. The method of claim 12, further comprises:

determining the presence of the debug symbol table associated with the target binary code;

determining a function corresponding to the target function based on the debug symbol table; and attaching the received probe to the determined function.

14. The method of claim 12, further comprises:

determining the presence of the dynamic linked library associated with the target binary code;

determining a function corresponding to the target function based in the dynamic linked library; and attaching the received probe to the determined function.

15. The method of claim 12, wherein the one or more versions of assembly codes are generated by:

compiling the received base source code based at least on: one or more architectures and one or more compile options to generate one or more binary codes along with corresponding debug symbol tables; and disassembling the generated one or more binary codes to generate one or more versions of assembly codes.

16. The method of claim 12, wherein the one or more architectures correspond to different versions of operating systems and variants of hardware architectures; and wherein the one or more compile options correspond to at least one of: optimization, debugging, target architecture, and feature selection.

17. The method of claim 12, further comprises:

receiving architecture associated with target device;

comparing the generated target assembly code with the retrieved one or more versions of the assembly code associated with the received architecture associated with the target device.

18. The method of claim 12, wherein the probe corresponds to an Extended Berkeley Packet Filter (eBPF) for tracing and monitoring the target function; and wherein the probe includes at least one of: uprobe for tracking and monitoring user function and kprobe for tracking and monitoring kernel functions.

19. The method of claim 12, wherein the pre-defined threshold value is selected from a range of values between 70-90 percent.

20. The method of claim 12, wherein if more than one version of the assembly code exceeds the pre-defined threshold value, then the version of assembly code with highest heuristic match is selected for attaching the probe.

* * * * *